United States Patent
Daher et al.

(10) Patent No.: US 9,552,527 B1
(45) Date of Patent: Jan. 24, 2017

(54) APPARATUS, METHOD, AND COMPUTER-READABLE STORAGE MEDIUM FOR DETERMINING A ROTATION ANGLE OF TEXT

(71) Applicant: LEAD TECHNOLOGIES, INC., Charlotte, NC (US)

(72) Inventors: Moe Daher, Charlotte, NC (US); Waseem Shadid, Charlotte, NC (US)

(73) Assignee: LEAD TECHNOLOGIES, INC., Charlotte, NC (US)

( * ) Notice: Subject to any disclaimer, the term of this patent is extended or adjusted under 35 U.S.C. 154(b) by 0 days.

(21) Appl. No.: 14/837,766

(22) Filed: Aug. 27, 2015

(51) Int. Cl.
G06K 9/36 (2006.01)
G06K 9/32 (2006.01)
G06K 9/18 (2006.01)
G06K 9/34 (2006.01)

(52) U.S. Cl.
CPC .............. G06K 9/3283 (2013.01); G06K 9/18 (2013.01); G06K 9/3208 (2013.01); G06K 9/348 (2013.01)

(58) Field of Classification Search
CPC ............. G06K 9/3208; G06K 9/3275–9/3283; G06K 9/18
See application file for complete search history.

(56) References Cited

U.S. PATENT DOCUMENTS

| | | | | |
|---|---|---|---|---|
| 5,513,304 A | * | 4/1996 | Spitz | G06K 9/348 382/295 |
| 5,517,578 A | * | 5/1996 | Altman | G06F 3/04883 345/173 |
| 6,148,119 A | | 11/2000 | Takaoka | |
| 7,151,860 B1 | | 12/2006 | Sakai et al. | |
| 8,027,539 B2 | | 9/2011 | Chen | |
| 8,744,189 B2 | | 6/2014 | Oh et al. | |
| 9,367,736 B1 | * | 6/2016 | Senechal | G06K 9/00463 |
| 2009/0285482 A1 | * | 11/2009 | Epshtein | G06K 9/00463 382/176 |
| 2010/0054585 A1 | * | 3/2010 | Guillou | G06K 9/3266 382/164 |
| 2010/0174732 A1 | * | 7/2010 | Levy | G06F 17/211 707/768 |
| 2011/0200257 A1 | * | 8/2011 | Oh | G06K 9/325 382/195 |

(Continued)

OTHER PUBLICATIONS

Beusekom, Joost van et al.; "Combined orientation and skew detection using geometric text-line modeling"; IJDAR; Jan. 16, 2010; pp. 79-92.

(Continued)

*Primary Examiner* — Sean Motsinger
(74) *Attorney, Agent, or Firm* — Oblon, McClelland, Maier & Neustadt, L.L.P.

(57) ABSTRACT

An apparatus, method, and computer-readable storage medium for determining a rotation angle of text. The method includes computing, for each object of a plurality of objects included in text within an image, a distance to a closest neighboring object, computing an average distance of the distances to the closest neighboring objects, determining a ratio between the average distance and an average font stroke width, the average font stroke width being an average of a font stroke width of each of the plurality of objects, and determining a rotation angle of the text by comparing the ratio to a threshold value.

17 Claims, 9 Drawing Sheets

(56) References Cited

U.S. PATENT DOCUMENTS

| | | | | |
|---|---|---|---|---|
| 2015/0063700 A1* | 3/2015 | Soundararajan | ......... | G06K 9/18 382/182 |
| 2015/0269431 A1* | 9/2015 | Haji | ................... | G06K 9/00879 382/186 |
| 2015/0278167 A1* | 10/2015 | Arnold | ................ | G06F 17/2211 382/155 |
| 2016/0026899 A1* | 1/2016 | Wang | ................. | G06K 9/00442 382/176 |

OTHER PUBLICATIONS

Konya, Iuliu et al.; "Fast Seamless Skew and Orientation Detection in Document Images"; 2010 International Conference on Pattern Recognition; 2010; pp. 1924-1928.

Yao, Cong, et al.; "Detecting Texts of Arbitrary Orientations in Natural Images"; retrieved from internet http://pages.ucsd.edu/~ztu/publication/cvpr12_textdetection.pdf; 8 pages.

* cited by examiner

LEADTOOLS

LEADTOOLS

LEADTOOLS —— 400

HELLO —— 410

LEADTOOLS —— 420

L
E
A
D
T
O
O
L
S
430 ——

LEADTOOLS —— 440

Figure 7

APPARATUS, METHOD, AND COMPUTER-READABLE STORAGE MEDIUM FOR DETERMINING A ROTATION ANGLE OF TEXT

FIELD

The present disclosure relates generally to the field of text orientation.

BACKGROUND

Typically, estimating an angle at which a character is drawn is performed using an Optical Character Recognition (OCR) process. This process is slow and not suitable for real-time OCR applications. Existing solutions either ignore such angle or request the user to specify the angle manually, which can be burdensome for the user especially with a high volume of text that needs to be processed.

SUMMARY

An apparatus, method, and computer-readable storage medium for determining a rotation angle of text. The method includes computing, for each object of a plurality of objects included in text within an image, a distance to a closest neighboring object, computing an average distance of the distances to the closest neighboring objects, determining a ratio between the average distance and an average font stroke width, the average font stroke width being an average of a font stroke width of each of the plurality of objects, and determining a rotation angle of the text by comparing the ratio to a threshold value.

BRIEF DESCRIPTION OF THE DRAWINGS

The disclosure will be better understood from reading the description which follows and from examining the accompanying figures. These figures are provided solely as non-limiting examples of the embodiments. In the drawings:

FIG. 2 (FIGS. 2A, 2B, 2C, and 2D) illustrates examples of vertical text according to one embodiment;

FIG. 7 illustrates an example of processes performed according to one embodiment.

DETAILED DESCRIPTION

Figure 1A:
FIG. 1 (FIGS. 1A, 1B, 1C, and 1D) illustrates four different rotation angles according to one embodiment.
Figure 1B:
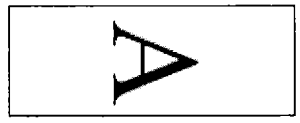
Figure 1C:
Figure 1D:
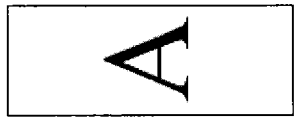

One embodiment is drawn to an apparatus for determining a rotation angle of text within an image, the apparatus comprising: circuitry configured to compute, for each object of a plurality of objects included in the text, a distance to a closest neighboring object, compute an average distance of the distances to the closest neighboring objects, determine a ratio between the average distance and an average font stroke width, the average font stroke width being an average of a font stroke width of each of the plurality of objects, and determine the rotation angle of the text by comparing the ratio to a threshold value.

In one embodiment, the circuitry is further configured to determine a bounding rectangle for each object, the bounding rectangle surrounding the respective object and contacting outer-most portions of the respective object, and the circuitry computes the distance to the closest neighboring object by calculating the distance of the respective bounding rectangle to a closest neighboring bounding rectangle.

In one embodiment, the circuitry is further configured to determine, for each object, an object area that corresponds to an entire printed area of the respective object within the image, determine, for each object, an object perimeter that corresponds to a perimeter of the respective object, and compute the font stroke width for each object by dividing the object area by the object perimeter and multiplying by 2.

In one embodiment, the circuitry is further configured to compute the average font stroke width by dividing a sum of the font stroke widths of the plurality of objects by the total number of the plurality of objects.

In one embodiment, the circuitry is further configured to, prior to computing the distance to the closest neighboring object for each object, determine one or more text blocks of the text within the image, each text block including a plurality of objects, determine, for each text block, whether the text block has a vertical orientation or a horizontal orientation, and compute the distance to the closest neighboring object for each object in a text block, in response to determining that the text block has a vertical orientation.

One embodiment is drawn to a method, the method comprising: computing, for each object of a plurality of objects included in text within an image, a distance to a closest neighboring object; computing an average distance of the distances to the closest neighboring objects; determining a ratio between the average distance and an average font stroke width, the average font stroke width being an average of a font stroke width of each of the plurality of objects; and determining a rotation angle of the text by comparing the ratio to a threshold value.

In one embodiment, the method further comprises: determining a bounding rectangle for each object, the bounding rectangle surrounding the respective object and contacting outer-most portions of the respective object, wherein the computing of the distance to the closest neighboring object is performed by calculating the distance of the respective bounding rectangle to a closest neighboring bounding rectangle.

In one embodiment, the method further comprises: determining, for each object, an object area that corresponds to an entire printed area of the respective object within the image; determining, for each object, an object perimeter that corresponds to a perimeter of the respective object; and computing the font stroke width for each object by dividing the object area by the object perimeter and multiplying by 2.

In one embodiment, the method further comprises: computing the average font stroke width by dividing a sum of the font stroke widths of the plurality of objects by the total number of the plurality of objects.

In one embodiment, the method further comprises: prior to the computing of the distance to the closest neighboring object for each object, determining one or more text blocks of the text within the image, each text block including a plurality of objects; determining, for each text block, whether the text block has a vertical orientation or a horizontal orientation; and computing the distance to the closest neighboring object for each object in a text block, in response to determining that the text block has a vertical orientation.

In one embodiment, the method further comprises: performing OCR on the text after the determining of the rotation angle of the text.

One embodiment is drawn to a non-transitory computer-readable storage medium including computer executable instructions, wherein the instructions, when executed by a computer, cause the computer to perform a method, the method comprising: computing, for each object of a plurality of objects included in text within an image, a distance to a closest neighboring object; computing an average distance of the distances to the closest neighboring objects; determining a ratio between the average distance and an average font stroke width, the average font stroke width being an average of a font stroke width of each of the plurality of objects; and determining a rotation angle of the text by comparing the ratio to a threshold value.

In one embodiment, the non-transitory computer-readable storage medium further comprises: determining a bounding rectangle for each object, the bounding rectangle surrounding the respective object and contacting outer-most portions of the respective object, wherein the computing of the distance to the closest neighboring object is performed by calculating the distance of the respective bounding rectangle to a closest neighboring bounding rectangle.

In one embodiment, the non-transitory computer-readable storage medium further comprises: determining, for each object, an object area that corresponds to an entire printed area of the respective object within the image; determining, for each object, an object perimeter that corresponds to a perimeter of the respective object; and computing the font stroke width for each object by dividing the object area by the object perimeter and multiplying by 2. In one embodiment, the non-transitory computer-readable storage medium further comprises: computing the average font stroke width by dividing a sum of the font stroke widths of the plurality of objects by the total number of the plurality of objects.

In one embodiment, the non-transitory computer-readable storage medium further comprises: prior to the computing computing the distance to the closest neighboring object for each object, determining one or more text blocks of the text within the image, each text block including a plurality of objects; determining, for each text block, whether the text block has a vertical orientation or a horizontal orientation; and computing the distance to the closest neighboring object for each object in a text block, in response to determining that the text block has a vertical orientation.

In one embodiment, the non-transitory computer-readable storage medium further comprises: performing OCR on the text after the determining of the rotation angle of the text.

The present disclosure is drawn to a fast method for estimating or determining an angle at which a character (for example, a letter) is drawn within an image for a text block that is flowed over vertical lines. This drawing angle is referred to as a rotation angle. Note that rotation and orientation may be used interchangeably throughout the present disclosure.

As illustrated in FIG. 1, in one embodiment, there may be four different rotation angles. FIG. 1A illustrates a character with a 0 degree rotation angle; FIG. 1B illustrates a character with a 90 degree rotation angle; FIG. 1C illustrates a character with a 180 degree rotation angle; and FIG. 1D illustrates a character with a 270 degree rotation angle.

Figures 2A, 2B:
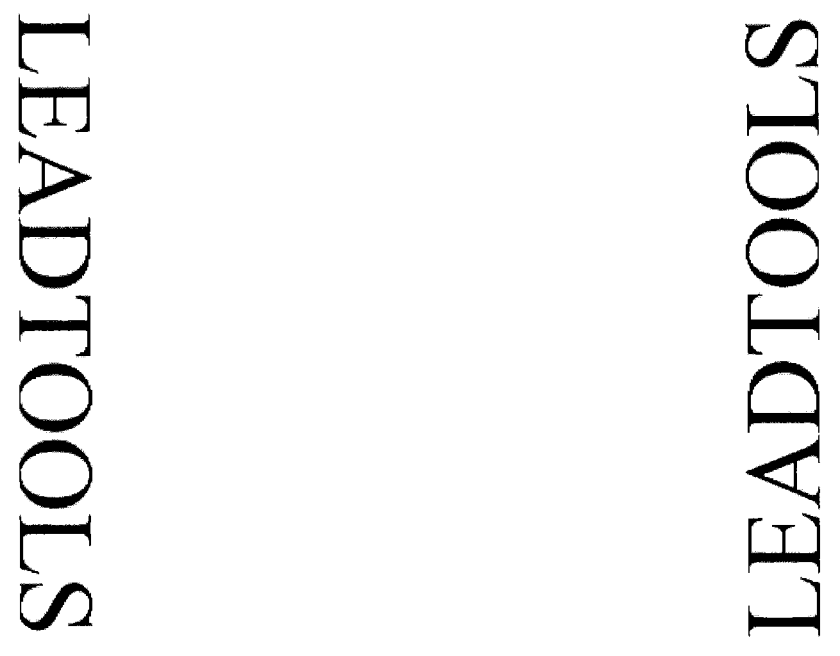
Figures 2C, 2D:
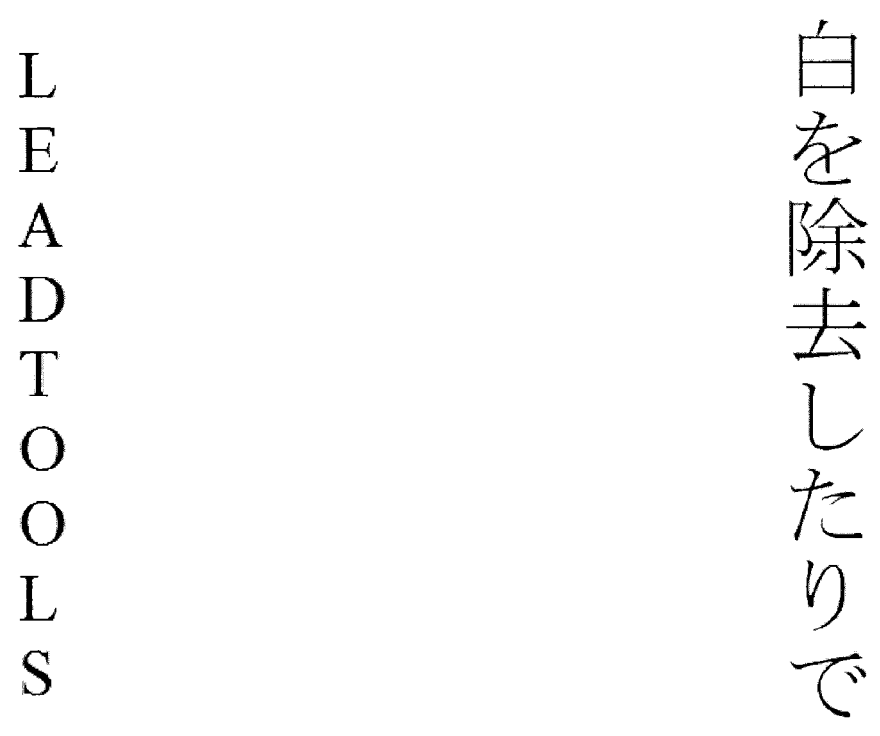

The text that is flowed over vertical lines instead of horizontal lines is referred to as vertical text. FIG. 2 illustrates four examples of vertical text. FIG. 2A illustrates an example of Latin text that is rotated by 90 degrees; FIG. 2B illustrates an example of Latin text that is rotated by 270 degrees; FIG. 2C illustrates an example of Latin text that is drawn vertically while the letters are not rotated (a 0-degree rotation); and FIG. 2D illustrates an example of Japanese text that is drawn vertically while the letters are not rotated.

Note that text is considered horizontal relative to the horizontal axis of the image (from left to right on the image) and text is considered vertical relative to the vertical axis of the image (from top to bottom on the image). The orientation of horizontal and vertical text is illustrated in FIGS. 1 and 2. Vertical text is sorted in columns (from top to bottom) in the image parallel to the vertical axis of the image, while horizontal text is sorted in rows (from left to right) in the image parallel to the horizontal axis of the image.

The present disclosure is drawn to performing a determination based on the size of inter-character spaces and properties of the drawn characters.

There are certain disadvantages to performing OCR on every single character to determine rotation. For example, this process is slow and not suitable for real-time OCR applications. As noted above, existing solutions either ignore the rotation angle for such text or request the user to specify the rotation angle manually.

As previously noted, embodiments herein describe a fast, automatic method to estimate the vertical text rotation angle. Embodiments of the present disclosure may be used to help the OCR process and other document applications improve their accuracy in real-time. For example, the embodiments discussed herein may be used first, and then OCR may apply the result to properly recognize the character(s). In other words, the rotation angle of text may first be determined as discussed below with reference to FIGS. 3 and 4, and then OCR may be applied to the text.

Figure 3:
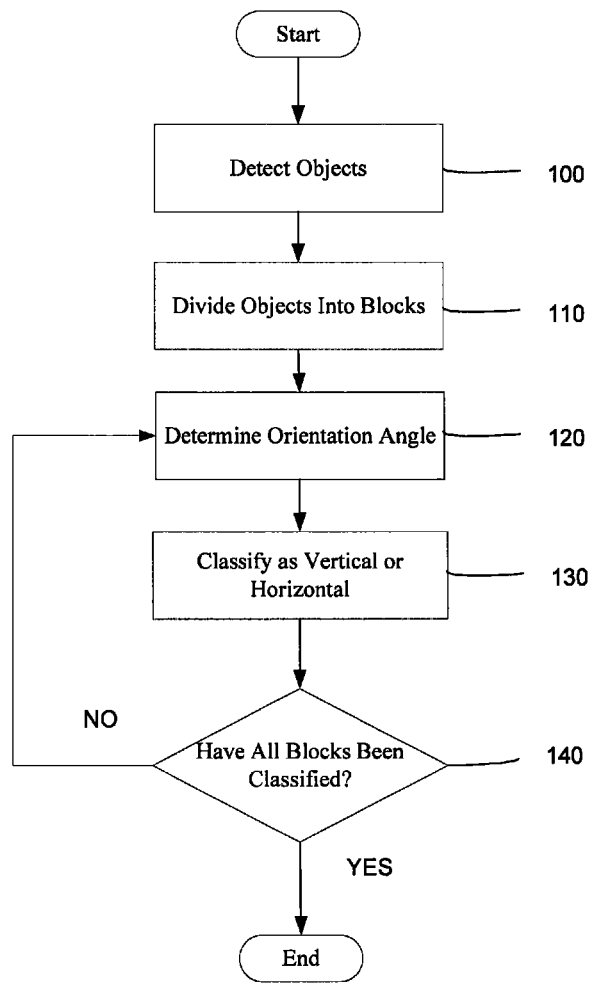
FIG. 3 illustrates a flowchart of a process to determine whether text blocks are vertical or horizontal according to one embodiment.

FIG. 3 illustrates a process to determine whether text blocks are vertical or horizontal, according to one embodiment. Note that a given image (for example, an image of a scanned document), for example, may have text drawn out (written) vertically and text drawn out (written) horizontally. Such image may represent an advertisement page, a newspaper page, a flyer page, etc., or any other type of page/document.

Thus, in one embodiment, objects (for example, characters or letters) are first detected within an image, in step 100. Note that, in the present disclosure, objects, characters, and letters may be used interchangeably. Next, in step 110, the objects are divided into blocks. A block, for example, may be any grouping of characters (for example, a sentence, a paragraph, etc.). A block may be differentiated from another block based on whether the distance therebetween is greater than a predetermined distance. For example, the distance between two paragraphs may be much greater than the distance between two characters in a word. Accordingly, such distance is used in determining the size of a block. In one embodiment, note that each block may be of a different size. In one embodiment, note that some block(s) may of the same size while other block(s) may be of different size(s).

Note that, in one embodiment, the minimum distance between blocks may be 2 times the size of a character, while the distance between characters is less than or equal to 0.2 times the size of the character. Note that these distances are in pixels.

Next, for each block, the orientation angle (i.e., 0 degrees, 90 degrees, 180 degrees, or 270 degrees) is determined, in step 120. In one embodiment, the orientation angle may be determined using the method discussed in "*Combined ori-* entation and skew detection using geometric text-line modeling" by Beusekom et al., published Jan. 16, 2010 in Springer-Verlag, the entire content of which is hereby incorporated by reference. In one embodiment, the orientation angle may be determined using the method discussed in "*Fast seamless skew and orientation detection in document images*" by Iuliu Konya et al. from the 2010 International Conference on Pattern Recognition, published January 2010 in IEEE, the entire content of which is hereby incorporated by reference. In one embodiment, the orientation angle may be determined by other method(s) known to one of ordinary skill in the art. For example, any method that can detect orientation and skew angle of an image may be used.

To briefly summarize, the method discussed in Beusekom et al. (hereinafter, Beusekom) uses geometric matching to extract text-lines from scanned documents. A quality function is defined that gives the quality of matching the text-line model to a given set of points. The goal is to find a collection of parameters for each text-line in the document image that maximizes the number of bounding boxes matching the model and that minimizes the distance of each reference point from the baseline in a robust least square sense. The key idea in Beusekom's approach is to use ascender modeling in the same way as modeling descenders.

The x-line (the line passing through the top of non-ascending lower case characters, such as, x, a, c, etc.) is modeled as a straight line, and the ascender line is modeled as a line parallel to the x-line at a distance above the x-line. Consider a set of reference points $\{y1, y2, \ldots, yn\}$ obtained by taking the middle of the top line of the bounding boxes of the connected components in a document image. The goal of text-line detection is to find the maximizing set. Since in Latin script ascenders are more likely to occur than descenders, more components will match the ascender line than the descender line. A component matching to descender/ascender receives a lower score when compared to a component matching to baseline/x-line. Therefore, in general, the total quality of the descender line will be higher than the total quality of the ascender line. This information is used to find the upside down orientation of the page.

In Beusekom's method, the quality of n best lines found using the descender model and then using the ascender model are summed. If the quality of the ascender model is higher than the descender model, the page is reported as upside down (180-degree rotated). Note that computing the ascender model for a given page image in a correct orientation is equivalent to computing the descender model for a 180-degree rotated page. Therefore, for any given image, only the descender model for the original image and for 180-degree rotated image are computed. The image that results in better descender quality is reported as the one with the correct orientation.

This concept is then easily extended to detected pages with a 90-degree and 270-degree orientation. The horizontal text-line model does not fit well on vertical text-lines, so for a right side up portrait page the total quality of n best lines in the vertical direction is much lower than the total quality of n best horizontal lines. Hence, by computing the descender quality by rotating the page with all four orientations, the correct orientation of the page can be determined.

Returning to FIG. 3, based on the result of the orientation angle, each block is classified as being either vertical or horizontal, in step 130. In particular, if the orientation angle of a block is 90 degrees or 270 degrees, it is classified as being vertical. Otherwise (i.e., if the orientation angle of a block is 0 degrees or 180 degrees), the block is classified as being horizontal. Note that, if a block is horizontal, then no further processing is needed as its rotation angle is the aforementioned orientation angle (i.e., the orientation angle determined using the method discussed in, for example, Beusekom).

In step 140, it is determined whether all blocks have been classified. If there is a block that has not yet been classified, the process moves back to step 120 and repeats until all blocks have been classified.

Figure 4:
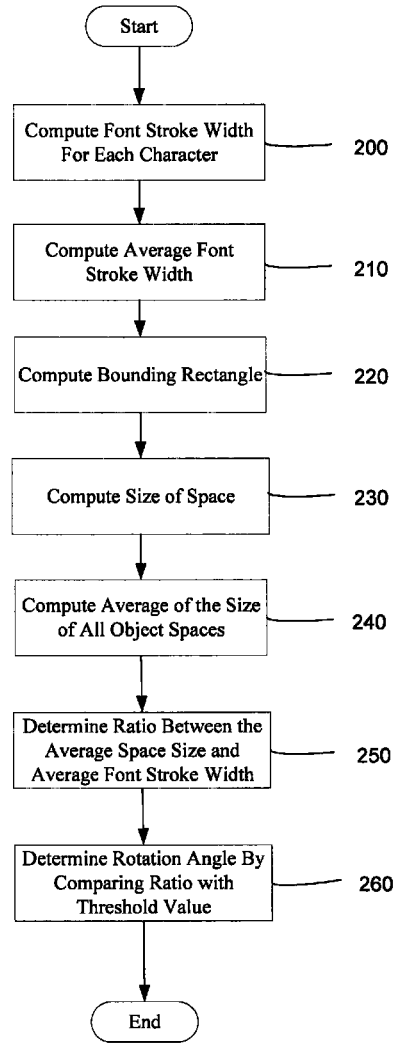
FIG. 4 illustrates a flowchart of a process to determine the rotation angle of vertical block(s) according to one embodiment.

If a block is classified as being vertical, the rotation angle (0 degrees (shown in FIG. 2C), 90 degrees (shown in FIG. 2A), or 270 degrees (shown in FIG. 2B)) is next determined with reference to FIG. 4. Accordingly, in step 200, for each character within the text block, the font stroke width is computed using Equation 1, below.

$$\text{Object Font Stroke Width} = \frac{\text{Object Area}}{\text{Object Perimeter}} \times 2 \quad \text{(Equation 1)}$$

Figure 5:
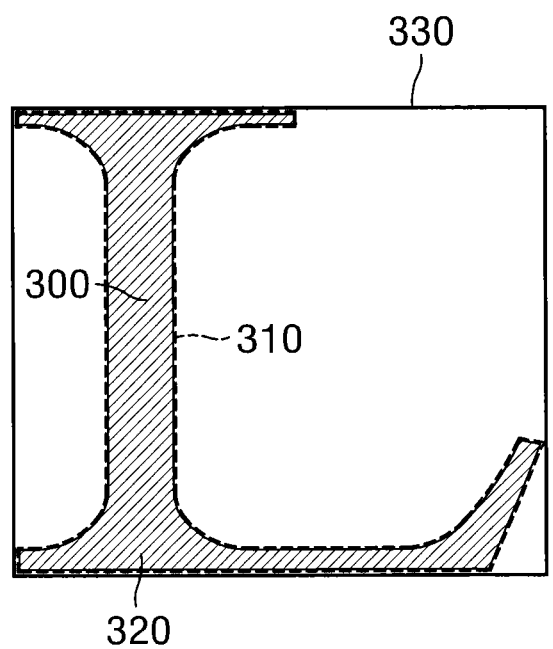
FIG. 5 illustrates an object according to one embodiment.

FIG. 5 illustrates the object area 300 and the object perimeter 310 for the letter "L" (object 320) according to one embodiment. Note that the object area 300 refers to the printed area of the character 320 (i.e., only the black part of the letter, if the character is drawn in the black color). The object perimeter 310 refers to the outside perimeter of the character 320 (i.e., the outline of the character/printed area). In other words, the object area 300 corresponds to the number of foreground pixels, and the object perimeter 310 corresponds to the perimeter outline. Note that, as an example, for a Calibri 11 font size, the maximum font stroke width is 7 pixels.

Next, in step 210, the average font stroke width of all characters 320 in a block is computed using Equation 2, below.

$$\text{Average Font Stroke Width} = \frac{\text{Sum of Object Font Width for All Objects}}{\text{Number of Objects}} \quad \text{(Equation 2)}$$

Then, for each object 320, a bounding rectangle 330 is computed (i.e., a box that surrounds the character 320 and contacts the outer-most portions of the character), in step 220. The bounding rectangle 330 for the object "L" 320 is illustrated in FIG. 5. Note that, in one embodiment, the bounding rectangle 330 does not contact the character 320, but may surround the character 320 and be at a distance (for example, 1 pixel) from the character 320.

Figure 6:
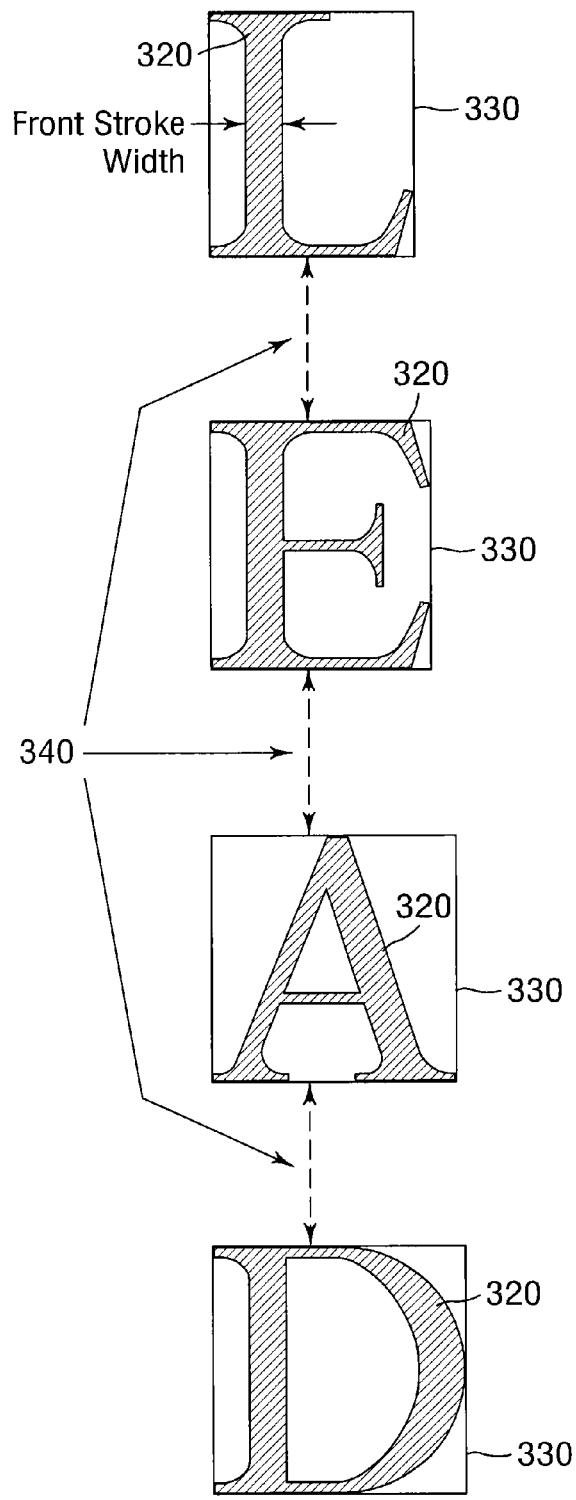
FIG. 6 illustrates a text block according to one embodiment.

Further, for each object 320, the size of the space 340 to its closest object 320 is computed (see FIG. 6), in step 230. Note that in one embodiment, this size is calculated from the bounding rectangle 330 of one object 320 to the bounding rectangle 330 of another (adjacent) object 320. As illustrated in FIG. 6, the aforementioned space 340 represents a distance of an object 320 to a closest neighboring object 320. Note that FIG. 6 illustrates one embodiment of a block of text in which objects 320 (i.e., each of "L," "E," "A," and "D") therein have a space 340 therebetween.

Next, the average of the size of all object spaces 340 is computed, in step 240. In step 250, a ratio between the average space size and the average font stroke width is determined using Equation 3, below.

$$\text{Ratio} = \frac{\text{Average Space Size}}{\text{Average Font Stroke Width}} \quad \text{(Equation 3)}$$

Next, in step 260, the ratio is compared to a threshold value T to determine the rotation angle. In one embodiment, the threshold value T may be a predetermined value that corresponds to the font thickness of most characters of a particular language. For example, in one embodiment, T may be set to a value of 3 for Latin languages because characters in Latin languages (such as English) are drawn with thicker font. Note that the value 3 represents the number of pixels making up the font thickness. In one embodiment, T may be set to a value of 5 for Asian languages because characters in Asian languages (such as Japanese) are drawn with thinner fonts (to write more details).

Note that the aforementioned threshold T is applicable to text of all styles (including text that is in bold and/or in italics). Furthermore, in one embodiment, the threshold may be modified based on the particular application to which it is applied. For example, a training framework such as Bayesian may be used to estimate the value for the threshold that fits a particular application. Such estimation may be performed by a system such as the system illustrated in FIG. 8.

Accordingly, if the determined ratio is greater than or equal to T (i.e., Ratio≥T), then the text block is determined to be vertical with characters therein having a 0-degree or 180-degree rotation angle. Otherwise (i.e., if the determined ratio is less than T (Ratio<T)), the text block is considered to be vertical with a rotation angle equal to the estimated rotation angle, as determined in step 120 of FIG. 3.

To briefly summarize an embodiment according to the present disclosure, assume a sheet/page containing the text illustrated in FIG. 7 is scanned using a scanner or similar device. In one embodiment, objects (for example, a letter or letters) within the scanned image are first detected. Once these objects are detected, they are divided into blocks. For example, the process determines five (5) blocks 400-440 in FIG. 7.

Next, it is determined whether each block 400-440 has a horizontal or vertical orientation. Note that this determination is performed for each block, and not for each object (letter) within each block. In performing the process illustrated in FIG. 3, it is determined that blocks 400 and 410 have a horizontal orientation relative to the image (scanned page) (i.e., horizontal text), and that blocks 420, 430, and 440 have a vertical orientation relative to the image (scanned page) (i.e., vertical text).

Next, for the blocks determined as having a vertical orientation, the process illustrated in FIG. 4 is applied. In this process, as discussed above, each object (letter) of each block 420, 430, and 440 is analyzed. By performing the process set forth in FIG. 4, it is determined that block 420 has a rotation angle of 90 degrees, that block 430 has a rotation angle of 0 degrees (i.e., letters within the block are not rotated, although text is drawn out vertically), and that block 440 has a rotation angle of 270 degrees.

Next, the rotational angle(s) may then be used by an OCR process to improve its accuracy and speed up computational time of recognizing characters. By having knowledge of the rotational angle of a particular block of text, the OCR process will know the particular layout of the text (for example, one of the layouts illustrated in FIG. 2) and will not waste computational time and power in attempting to recognize a letter assuming it has no rotation when the letter is actually rotated. This, in turn, provides improvements to the functioning of the apparatus/machine that performs the above-discussed processes as it saves computational time and power and improves accuracy.

Further note that the embodiments of the present disclosure may be used to determine the orientation of text in order to assist OCR in properly recognizing characters and/or to rotate text if, for example, a sheet containing the text is improperly scanned in.

The embodiments of the present disclosure present numerous differences from conventional techniques. For example, character recognition (for example, OCR) is not used to find the rotation angle. Further, the rotation angle is determined per text block and not for the whole scanned image. In other words, according to one embodiment, the process does not simply determine that since block 400 of FIG. 7 is horizontal, the entire image must also be horizontal. Rather, each block is separately investigated to accurately determine its orientation. If text is to be rotated, each block of text is individually rotated based on its orientation angle. Thus, in one embodiment, an entire scanned image is not rotated based on the detected orientation of a block.

Further, the embodiments of the present disclosure may be applied to Latin languages, Asian languages, etc. Additionally, the embodiments of the present disclosure may apply to text of any font and size.

Each of the functions/methods/processes described in the embodiments may be implemented by one or more processing circuits (or circuitry). For example, the processes illustrated in FIGS. 3 and 4 may be implemented by one or more processing circuits (or circuitry). A processing circuit includes a programmed processor (for example, processor 1203 of FIG. 8), as a processor includes circuitry. A processing circuit also includes devices such as an application specific integrated circuit (ASIC) and conventional circuit components arranged to perform the recited functions.

Figure 8:
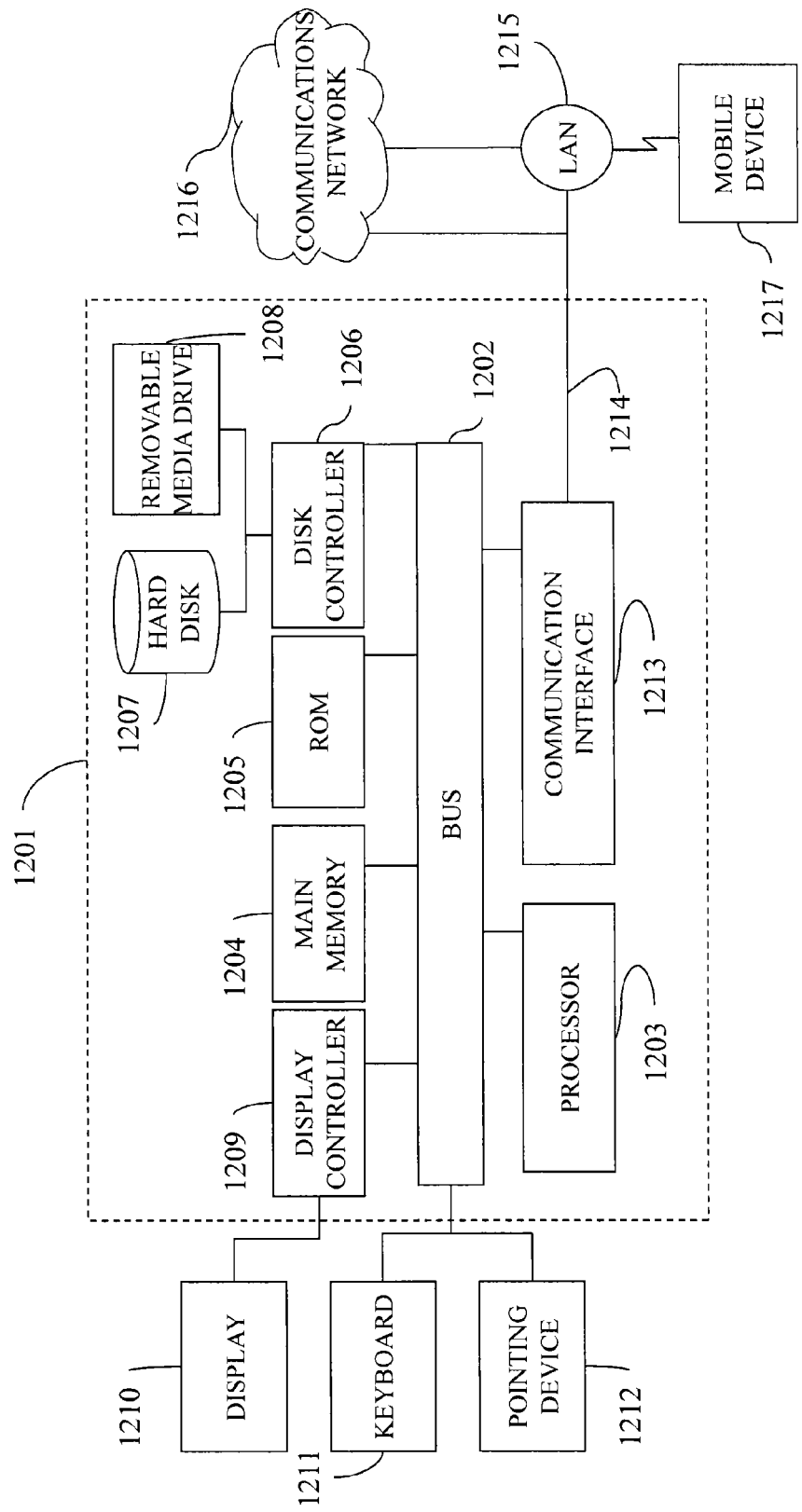
FIG. 8 illustrates a computer system upon which embodiment(s) of the present disclosure may be implemented.

FIG. 8 illustrates a computer system 1201 upon which embodiment(s) of the present disclosure may be implemented. The computer system 1201 may be a general-purpose computer or a particular, special-purpose machine. In one embodiment, the computer system 1201 becomes a particular, special-purpose machine when the processor 1203 is programmed to determine the rotation angle of an object/text. The computer system 1201 may be embodied as (or be a part of) a multifunction peripheral (MFP), an all-in-one printer, a scanner, or the like.

The computer system 1201 includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., ASICs) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, which may be a liquid crystal display (LCD), for displaying information to a computer user. Note that display 1210 may also be a touch panel display. The computer system includes input devices, such as a keyboard 1211 and a pointing device 1212, for interacting with a computer user and providing information to the processor 1203. The pointing device 1212, for example, may be a mouse, a trackball, a finger for a touch screen sensor, or a pointing stick for communicating direction information and command selections to the processor 1203 and for controlling cursor movement on the display 1210.

The computer system 1201 performs a portion or all of the processing steps of the present disclosure in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 1201, for driving a device or devices for implementing the invention, and for enabling the computer system 1201 to interact with a human user. Such software may include, but is not limited to, device drivers, operating systems, and applications software. Such computer readable media further includes the computer program product of the present disclosure for performing all or a portion (if processing is distributed) of the processing performed in implementing the invention.

The computer code devices may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 1203 for execution. A computer readable medium may take many forms, including but not limited to, non-volatile media or volatile media. Non-volatile media includes, for example, optical, magnetic disks, and magneto-optical disks, such as the hard disk 1207 or the removable media drive 1208. Volatile media includes dynamic memory, such as the main memory 1204. Transmission media, on the contrary, includes coaxial cables, copper wire and fiber optics, including the wires that make up the bus 1202. Transmission media may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 1201 may receive the data on the telephone line and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an integrated services digital network (ISDN) card. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to an electronic device (for example, a mobile device) 1217.

It must be noted that the various elements, features and processes described herein may be used independently of one another, or may be combined in various ways. All possible combinations and subcombinations are intended to fall within the scope of this disclosure. Further, nothing in the present disclosure is intended to imply that any particular feature, element, component, characteristic, step, module, method, process, task, or block is necessary or indispensable (unless specifically indicated otherwise). The example systems and components described herein may be configured differently than described. For example, elements or components may be added to, removed from, or rearranged compared to the disclosed examples.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. All possible combinations and subcombinations of embodiments are intended to fall within the scope of this disclosure. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" and "an" as used in this application and the appended claims are to be construed to mean "one or more" or "at least one" unless specified otherwise.

The invention claimed is:

1. An apparatus for determining a rotation angle of text within an image, the apparatus comprising:
    circuitry configured to
        compute, for each object of a plurality of objects included in the text, a distance to a closest neighboring object,
        compute an average distance of the distances to the closest neighboring objects,
        determine a ratio between the average distance and an average font stroke width, the average font stroke width being an average of a font stroke width of each of the plurality of objects, and
        determine the rotation angle of the text by comparing the ratio to a threshold value.

2. The apparatus of claim 1, wherein
    the circuitry is further configured to determine a bounding rectangle for each object, the bounding rectangle surrounding the respective object and contacting outer-most portions of the respective object, and
    the circuitry computes the distance to the closest neighboring object by calculating the distance of the respective bounding rectangle to a closest neighboring bounding rectangle.

3. The apparatus of claim 1, wherein the circuitry is further configured to
    determine, for each object, an object area that corresponds to an entire printed area of the respective object within the image,
    determine, for each object, an object perimeter that corresponds to a perimeter of the respective object, and
    compute the font stroke width for each object by dividing the object area by the object perimeter and multiplying by 2.

4. The apparatus of claim 3, wherein the circuitry is further configured to compute the average font stroke width by dividing a sum of the font stroke widths of the plurality of objects by the total number of the plurality of objects.

5. The apparatus of claim 1, wherein the circuitry is further configured to, prior to computing the distance to the closest neighboring object for each object,
    determine one or more text blocks of the text within the image, each text block including a plurality of objects,
    determine, for each text block, whether the text block has a vertical orientation or a horizontal orientation, and
    compute the distance to the closest neighboring object for each object in a text block, in response to determining that the text block has a vertical orientation.

6. A method comprising:
    computing, for each object of a plurality of objects included in text within an image, a distance to a closest neighboring object;
    computing an average distance of the distances to the closest neighboring objects;
    determining a ratio between the average distance and an average font stroke width, the average font stroke width being an average of a font stroke width of each of the plurality of objects; and
    determining a rotation angle of the text by comparing the ratio to a threshold value.

7. The method of claim 6, further comprising:
    determining a bounding rectangle for each object, the bounding rectangle surrounding the respective object and contacting outer-most portions of the respective object, wherein
    the computing of the distance to the closest neighboring object is performed by calculating the distance of the respective bounding rectangle to a closest neighboring bounding rectangle.

8. The method of claim 6, further comprising:
    determining, for each object, an object area that corresponds to an entire printed area of the respective object within the image;
    determining, for each object, an object perimeter that corresponds to a perimeter of the respective object; and
    computing the font stroke width for each object by dividing the object area by the object perimeter and multiplying by 2.

9. The method of claim 8, further comprising:
    computing the average font stroke width by dividing a sum of the font stroke widths of the plurality of objects by the total number of the plurality of objects.

10. The method of claim 6, further comprising:
    prior to the computing of the distance to the closest neighboring object for each object,
        determining one or more text blocks of the text within the image, each text block including a plurality of objects;
        determining, for each text block, whether the text block has a vertical orientation or a horizontal orientation; and
        computing the distance to the closest neighboring object for each object in a text block, in response to determining that the text block has a vertical orientation.

11. The method of claim 6, further comprising:
    performing optical character recognition (OCR) on the text after the determining of the rotation angle of the text.

12. A non-transitory computer-readable storage medium including computer executable instructions, wherein the instructions, when executed by a computer, cause the computer to perform a method, the method comprising:

computing, for each object of a plurality of objects included in text within an image, a distance to a closest neighboring object;

computing an average distance of the distances to the closest neighboring objects;

determining a ratio between the average distance and an average font stroke width, the average font stroke width being an average of a font stroke width of each of the plurality of objects; and determining a rotation angle of the text by comparing the ratio to a threshold value.

13. The non-transitory computer-readable storage medium of claim 12, further comprising:

determining a bounding rectangle for each object, the bounding rectangle surrounding the respective object and contacting outer-most portions of the respective object, wherein the computing of the distance to the closest neighboring object is performed by calculating the distance of the respective bounding rectangle to a closest neighboring bounding rectangle.

14. The non-transitory computer-readable storage medium of claim 12, further comprising:

determining, for each object, an object area that corresponds to an entire printed area of the respective object within the image;

determining, for each object, an object perimeter that corresponds to a perimeter of the respective object; and computing the font stroke width for each object by dividing the object area by the object perimeter and multiplying by 2.

15. The non-transitory computer-readable storage medium of claim 14, further comprising:

computing the average font stroke width by dividing a sum of the font stroke widths of the plurality of objects by the total number of the plurality of objects.

16. The non-transitory computer-readable storage medium of claim 12, further comprising:

prior to the computing computing the distance to the closest neighboring object for each object, determining one or more text blocks of the text within the image, each text block including a plurality of objects;

determining, for each text block, whether the text block has a vertical orientation or a horizontal orientation; and computing the distance to the closest neighboring object for each object in a text block, in response to determining that the text block has a vertical orientation.

17. The non-transitory computer-readable storage medium of claim 12, further comprising:

performing optical character recognition (OCR) on the text after the determining of the rotation angle of the text.

* * * * *